United States Patent
Imamura et al.

(10) Patent No.: US 11,097,612 B1
(45) Date of Patent: Aug. 24, 2021

(54) DRIVING FORCE DISTRIBUTION CONTROL SYSTEM FOR VEHICLE

(71) Applicant: Mazda Motor Corporation, Hiroshima (JP)

(72) Inventors: Yasumasa Imamura, Aki-gun (JP); Daisuke Umetsu, Aki-gun (JP); Yoichi Fujioka, Aki-gun (JP); Naoki Nobutani, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/102,102

(22) Filed: Nov. 23, 2020

(30) Foreign Application Priority Data

Feb. 6, 2020 (JP) .............................. JP2020-018945

(51) Int. Cl.
*B60K 17/348* (2006.01)
*B60K 23/08* (2006.01)
*B60K 17/02* (2006.01)

(52) U.S. Cl.
CPC .......... *B60K 23/0808* (2013.01); *B60K 17/02* (2013.01); *B60K 17/348* (2013.01); *B60K 2023/0833* (2013.01)

(58) Field of Classification Search
CPC .. B60K 23/0808; B60K 17/02; B60K 17/348; B60K 2023/0833
See application file for complete search history.

(56) References Cited

U.S. PATENT DOCUMENTS

| 2006/0231314 | A1* | 10/2006 | Homan | B60K 23/08 180/233 |
| 2016/0160998 | A1* | 6/2016 | Sutton | F16H 63/42 701/51 |
| 2020/0180627 | A1* | 6/2020 | Hoare | B60K 28/16 |

FOREIGN PATENT DOCUMENTS

JP          2008149794 A    7/2008

\* cited by examiner

*Primary Examiner* — Justin Holmes
(74) *Attorney, Agent, or Firm* — Alleman Hall Creasman & Tuttle LLP

(57) ABSTRACT

A driving force distribution control system for a four-wheel drive vehicle is provided. The four-wheel drive vehicle uses front wheels as main driving wheels, and when a towed vehicle is coupled to a coupling part provided to a rear part of the four-wheel drive vehicle, the towed vehicle has the center of gravity position so that a downward load in a vehicle up-and-down direction is applied to the rear part of the vehicle through the coupling part. A driving force distribution control device includes a towing determination module configured to determine whether the vehicle is towing the towed vehicle, and when it is determined that the vehicle is towing the towed vehicle, a driving force distribution control device controls the driving force distributing device so that the driving force distributing amount to rear wheels becomes larger than that when the four-wheel drive vehicle is not towing the towed vehicle.

20 Claims, 6 Drawing Sheets

DRIVING FORCE DISTRIBUTION CONTROL SYSTEM FOR VEHICLE

TECHNICAL FIELD

The present disclosure relates to a driving force distribution control system for a vehicle, particularly to a driving force distribution control system for a four-wheel drive vehicle which controls a driving force distribution ratio of front and rear wheels of the vehicle which is capable of towing a towed vehicle.

BACKGROUND OF THE DISCLOSURE

Conventionally, for example, JP2008-149794A discloses a four-wheel drive vehicle for controlling actuation of main drive wheels to which torque of a drive source is always transmitted and actuation of a torque coupling which has a changeable driving force distribution according to a traveling state of the vehicle to control a torque transmission distributing amount to auxiliary driving wheels.

This vehicle performs a towing determination of the vehicle based on a driving force and acceleration, and if the vehicle is not currently towing and is not in a slipping state, it reduces the transmitted torque to the auxiliary driving wheels.

Here, generally, the driving force distribution between the main driving wheels and the auxiliary driving wheels of the four-wheel drive vehicle can be controlled, and the vehicle estimates ground load states of the front and rear wheels in each traveling scene including traveling on a road surface with low µ, and adjusts the driving force distribution so that the tires do not slip.

However, during towing in which a towing vehicle (four-wheel drive vehicle) tows a towed vehicle, while the towed vehicle is coupled to a coupling part for towing at the rear part of the towing vehicle, and a downward load is applied to the coupling part from the towed vehicle, the downward force is transmitted to the rear part of the towing vehicle. In such a case, the present inventors discovered a problem in which the vehicle achieves a posture such that the rear part of the towing vehicle sinks downwardly and the front part is raised. This posture lowers the ground load of the front wheels to cause a slip of the front wheels. Such a problem becomes particularly severe in a towing vehicle which uses the front wheels as the main drive wheels.

SUMMARY OF THE DISCLOSURE

Therefore, the present disclosure is made in order to solve the problem described above, and one purpose thereof is to provide a driving force distribution control system for a four-wheel drive vehicle which uses front wheels as main drive wheels, which can suppress a slip of the front wheels of which the ground load decreases during towing.

According to one aspect of the present disclosure, a driving force distribution control system for a four-wheel drive vehicle is provided, which controls a distributing amount of a driving force of front and rear wheels of the vehicle capable of towing a towed vehicle. The system includes a driving force distributing device configured to distribute the driving force of the front and rear wheels of the four-wheel drive vehicle, and a driving force distribution control device configured to control the driving force distributing amount of the front and rear wheels by the driving force distributing device. The four-wheel drive vehicle uses the front wheels as main drive wheels and distributes the driving force of the front wheels to the rear wheels through the driving force distributing device. When the towed vehicle is coupled to a coupling part provided to a rear part of the four-wheel drive vehicle, the towed vehicle has the center of gravity position so that a downward load in a vehicle up-and-down direction is applied to the rear part of the four-wheel drive vehicle through the coupling part. The driving force distribution control device includes a processor configured to execute a towing determination module to determine whether the four-wheel drive vehicle is towing the towed vehicle. When the towing determination module determines that the four-wheel drive vehicle is towing the towed vehicle, the driving force distribution control device controls the driving force distributing device so that the driving force distributing amount to the rear wheels of the four-wheel drive vehicle becomes larger than the driving force distributing amount when the towing determination module determines that the four-wheel drive vehicle is not towing the towed vehicle.

When it is determined that the four-wheel drive vehicle is towing the towed vehicle, the driving force distribution control device controls the driving force distributing device so that the driving force distributing amount to the rear wheels of the four-wheel drive vehicle becomes larger than when it is determined to be not towing the towed vehicle. Therefore, even if the rear part of the towing vehicle (four-wheel drive vehicle) is depressed by the towed vehicle downwardly in the vehicle up-and-down direction, and in connection with this, the force in the direction in which the front wheels of the four-wheel drive vehicle are raised occurs in the four-wheel drive vehicle, the driving force distribution of the front wheels can be reduced by the increased amount of the driving force distributed to the rear wheels, and therefore, the driving torque transmitted to the road surface from the front wheels can be reduced. Moreover, as components of the force which acts on the four-wheel drive vehicle from a suspension system of the rear wheels by increasing the driving force distributed to the rear wheels, when a component of the force which pushes up the rear part of the four-wheel drive vehicle in the vehicle up-and-down direction acts, in addition to a component of the force which propels the four-wheel drive vehicle forward, since the force for relatively sinking the front part of the four-wheel drive vehicle downwardly (a force in the pitching direction to move the four-wheel drive vehicle into a forward-inclining posture) occurs in the four-wheel drive vehicle, the lift of the front wheels resulting from towing of the towed vehicle can be suppressed, and the ground load of the front wheels can be increased. As the results, according to this embodiment, the four-wheel drive vehicle which uses the front wheels as the main drive wheels can suppress the slip of the front wheels of which the ground load decreases during towing.

The driving force distribution control device may include a processor configured to execute a basic driving force distribution ratio determination module to determine a basic driving force distribution ratio of the front and rear wheels of the four-wheel drive vehicle, when the towing determination module determines that the four-wheel drive vehicle is not towing the towed vehicle and/or an accelerator opening sensor does not detect a demanded acceleration by a driver, and a driving force distribution ratio correction module configured to correct the basic driving force distribution ratio so that the driving force distribution ratio to the rear wheels is increased relative to the basic driving force distribution ratio of the front and rear wheels determined by the basic driving force distribution ratio determination module, when the towing determination module determines that the four-wheel drive vehicle is towing the towed vehicle and the accelerator opening sensor detects the driver's demanded acceleration. When the towing determination module determines that the four-wheel drive vehicle is towing the towed vehicle and the accelerator opening sensor detects the driver's demanded acceleration, the driving force distribution control device may calculate the driving force distributing amount to the rear wheels based on the driving force distribution ratio corrected by the driving force distribution ratio correction module, and control the driving force distributing device based on the driving force distributing amount to the rear wheels.

According to this configuration, the driving force distribution control device determines the basic driving force distribution ratio of the front and rear wheels during not-towing (for example, the distribution ratio which suppresses the slip depending on the road surface u, the distribution ratio which reduces the heat release and the energy loss when the driving force distributing device is the coupling device comprised of the plurality of friction plates). If the towing vehicle is towing, the basic driving force distribution ratio is corrected, the driving force distributing amount to the rear wheels is calculated based on the corrected driving force distribution ratio, and the driving force distributing device is controlled based on the calculated driving force distributing amount, and thus, the slip of the front wheels can effectively be suppressed.

The driving force distribution control device may further include the accelerator opening sensor configured to detect the driver's demanded acceleration of the four-wheel drive vehicle. When the towing determination module determines that the four-wheel drive vehicle is towing the towed vehicle, the driving force distribution control device may control the driving force distributing device so that the driving force distributing amount to the rear wheels of the four-wheel drive vehicle becomes larger as the driver's demanded acceleration detected by the accelerator opening sensor increases.

According to this configuration, since the driving force distributing amount to the rear wheels is made larger as the driver's demanded acceleration increases, and the driving force distribution of the front wheels can be reduced accordingly, the slip of the front wheels can be suppressed more effectively. That is, although the four-wheel drive vehicle becomes in a rearward-inclining posture in the side view by an inertia force acting at the center of gravity and the ground load of the front wheels becomes smaller as the acceleration of the towing vehicle (the four-wheel drive vehicle) increases, according to this configuration, the driving force distribution of the front wheels can be reduced, and the slip of the front wheels can be suppressed.

The driving force distribution control device may control the driving force distributing device so that the driving force distributing amount to the rear wheels of the four-wheel drive vehicle becomes larger as the weight of the towed vehicle increases. According to this configuration, the driving force distributing amount to the rear wheels of the four-wheel drive vehicle is made larger as the weight of the towed vehicle increases, the driving force distribution of the front wheels can be reduced accordingly, and therefore, the slip of the front wheels can be suppressed more effectively.

The processor may be further configured to execute a towed-vehicle load detection module to detect a load of the towed vehicle applied to the rear part of the four-wheel drive vehicle. The driving force distribution control device may control the driving force distributing device so that the driving force distributing amount to the rear wheels of the four-wheel drive vehicle becomes larger as the load detected by the towed-vehicle load detection module increases. According to this configuration, the driving force distributing amount to the rear wheels is made larger as the load detected by the towed-vehicle load detection module increases and the driving force distribution of the front wheels can be reduced accordingly, and therefore, the slip of the front wheels can be suppressed more effectively.

The towing determination module of the driving force distribution control device may determine that the four-wheel drive vehicle is towing the towed vehicle, when a towing mode is selected by the driver via a towing mode switch. According to this configuration, since the driving force distribution control during towing is performed when the towing mode is selected by the driver, the discomfort of the driver can be suppressed.

The driving force distribution control system may further include a towing sensor configured to determine whether the towed vehicle is coupled to the coupling part provided to the rear part of the four-wheel drive vehicle. While the towing sensor determines that the towed vehicle is coupled, the towing determination module of the driving force distribution control device may accept a selection of the towing mode by the driver and determine that the four-wheel drive vehicle is towing the towed vehicle. According to this configuration, while the towed vehicle is coupled to the coupling part of the four-wheel drive vehicle (i.e., while towing is actually performed), the towed-vehicle coupling determining device determines that the four-wheel drive vehicle is towing the towed vehicle, and therefore, the driving force distribution control during towing is performed more effectively.

The driving force distributing device may include a clutch coupling a propeller shaft and a differential gear mechanism for the rear wheels so as to be switchable between a connecting state and a disconnecting state, an input side thereof being connected to the propeller shaft and an output side thereof is connected to the differential gear mechanism for the rear wheels. The driving force distributing device may be controlled by the driving force distribution control device, and control the distributing amount of the driving force (driving torque) of the front wheels and the rear wheels by controlling a fastening force between a plurality of friction plates of the clutch.

The towed vehicle may be a trailer, and the trailer may be coupled to the rear part of the four-wheel drive vehicle, that is the towing vehicle, through a hitch comprised of a hitch member provided to the rear part of the four-wheel drive vehicle and a coupler of the trailer.

DETAILED DESCRIPTION OF THE DISCLOSURE

Figure 1:
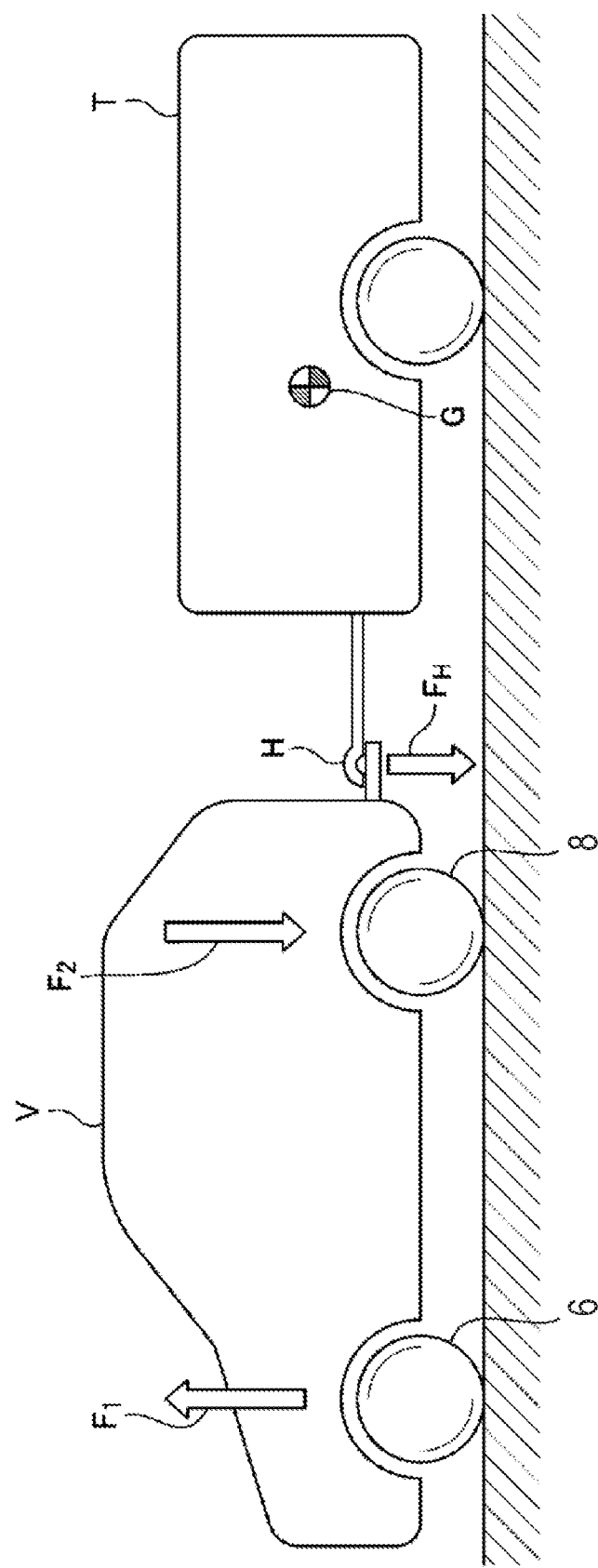
FIG. 1 is a side view illustrating a four-wheel drive vehicle which is a towing vehicle to which a driving force distribution control system for the vehicle according to one embodiment of the present disclosure is applied, and a trailer which is a towed vehicle, and schematically illustrating a concept of forces acting on the vehicles during towing.

Hereinafter, a driving force distribution control system for a vehicle according to one embodiment of the present disclosure is described with reference to the accompanying drawings. First, referring to FIG. 1, a reduction in a ground load of front wheels of a vehicle (towing vehicle) which is a four-wheel drive vehicle, when the vehicle (towing vehicle) tows a trailer (towed vehicle), is described. FIG. 1 is a side view illustrating the four-wheel drive vehicle which is the towing vehicle to which the driving force distribution control system for the vehicle according to this embodiment of the present disclosure is applied, and the trailer which is the towed vehicle, and schematically illustrating a concept of forces acting on the vehicles during towing.

As illustrated in FIG. 1, a towed vehicle T (e.g., a trailer) is coupled to a rear part of a towing vehicle V through a hitch H comprised of a hitch member provided to the rear part of the towing vehicle V and a coupler of the towed vehicle T. In this embodiment, the towed vehicle T is a trailer with one axle and two wheel, and in order to secure the traveling stability during towing, a center of gravity G thereof is located at a position forward of the one axle and two wheels in a trailer front-and-rear direction, as illustrated in FIG. 1. Thus, a suitable normal or vertical load (e.g., 10%-20% of the total weight of the towed vehicle T) is applied to the hitch H.

Therefore, as illustrated in FIG. 1, when the towed vehicle T is coupled, a downward force $F_H$ in an up-and-down direction of the vehicle V is applied to the hitch H (hitch point). This force $F_H$ is transmitted to the rear part of the vehicle V so that, on the vehicle V, a force $F_2$ which sinks the rear part occurs and a force $F_1$ which relatively raises the front part occurs. Among these, the force $F_1$ which raises the front part of the vehicle V reduces a ground load of front wheels 6 against a road surface, and the front wheels 6 become easier to slip for the reduced amount of the ground load. On the other hand, the ground load of rear wheels $W_R$ increases.

In this embodiment of the present disclosure described below, a driving force distribution control system 1 (FIG. 2) for the vehicle applied to the four-wheel drive vehicle 2 suppresses the slip of the front wheels 6 of such a vehicle V resulting from the reduction in the ground load of the front wheels 6. Note that as a modification of the towed vehicle T, it may be a trailer without the one axle and two wheels described above, or may be a trailer without the center of gravity position described above, as long as it is a trailer which applies the downward force to the hitch H while being coupled to the vehicle V (during towing)

Figure 2:
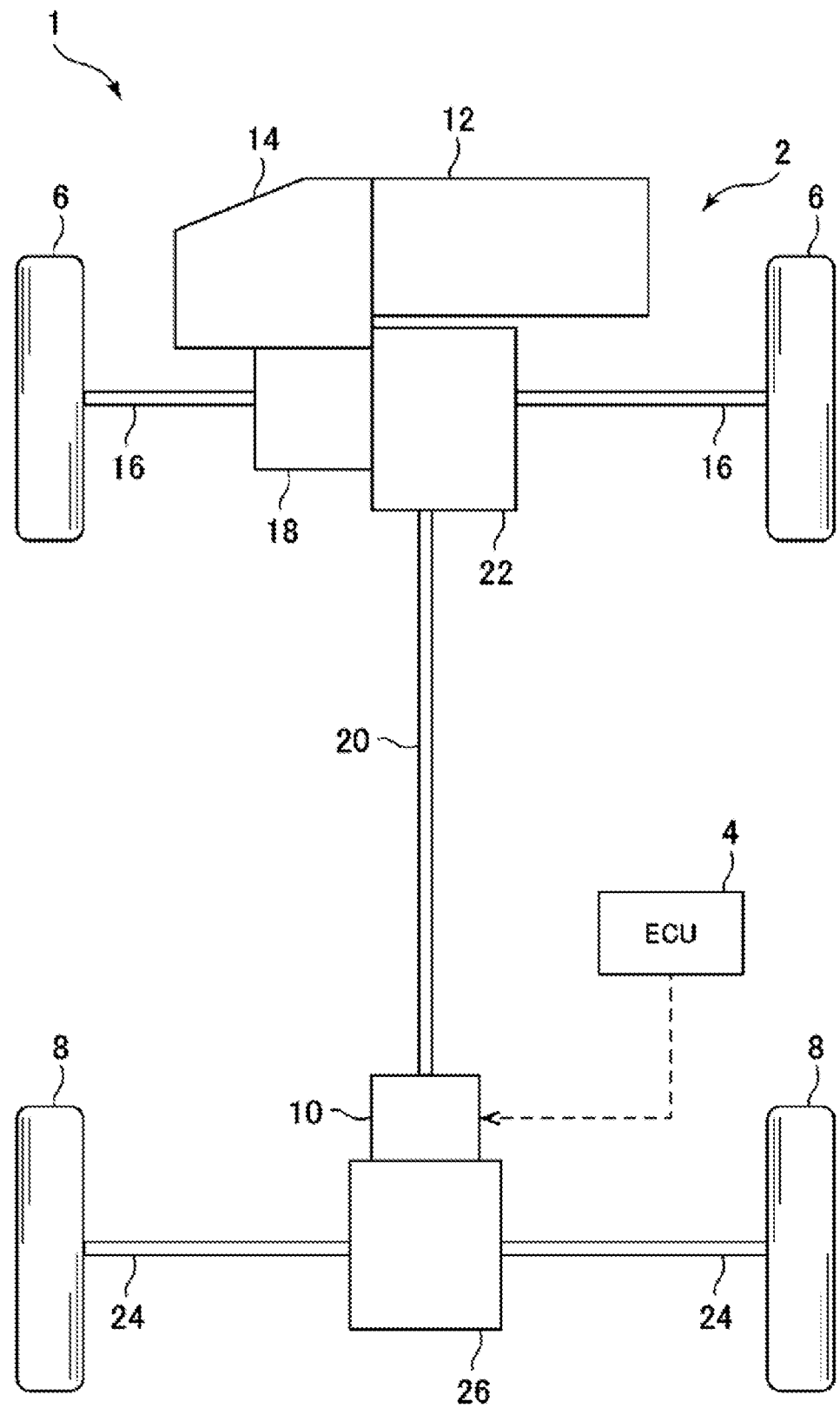
FIG. 2 is a plan view schematically illustrating a configuration of the four-wheel drive vehicle provided with the driving force distribution control system for the vehicle according to this embodiment of the present disclosure.

Next, an outline configuration of the four-wheel drive vehicle provided with the driving force distribution control system for the vehicle according to this embodiment of the present disclosure is described with reference to FIG. 2. FIG. 2 is a plan view schematically illustrating the configuration of the four-wheel drive vehicle provided with the driving force distribution control system for the vehicle according to this embodiment of the present disclosure. As illustrated in FIG. 2, the driving force distribution control system 1 for the vehicle according to this embodiment is applied to the four-wheel drive vehicle 2.

First, the four-wheel drive vehicle 2 is provided with the left and right front wheels 6 as main drive wheels, and left and right rear wheels 8 as auxiliary drive wheels. The four-wheel drive vehicle 2 is a so-called "FF" (front engine front-wheel drive) based four-wheel drive vehicle which distributes a driving force of the front wheels 6 to the rear wheels 8 through a coupling device (driving force distributing device) 10. Here, the coupling device 10 is controlled by an ECU (Electronic Control Unit) 4 (see FIG. 3, etc.). The ECU 4 is an example of a "driving force distribution control device" in the present disclosure, and the coupling device 10 is an example of a "driving force distributing device" in the present disclosure. The control of the coupling device 10 is executed by circuitry inside the ECU 4.

Next, the four-wheel drive vehicle 2 includes an engine 12 as a drive source, a transmission 14, and a differential gear mechanism 18 for the front wheels 6 which distributes a driving force transmitted from the engine 12 to the left and right front wheels 6 through a drive shaft 16 for the front wheels. The four-wheel drive vehicle 2 also includes a transfer 22 which distributes the driving force of the engine 12 to the rear wheels 8 through a propeller shaft 20, the coupling device 10 connected to the propeller shaft 20, and a differential gear mechanism 26 for the rear wheels 8 which is connected to the coupling device 10 and distributes the distributed driving force to the left and right rear wheels 8 through a drive shaft 24 for the rear wheels 8.

The coupling device 10 has a multiplate wet clutch (not illustrated) which couples the propeller shaft 20 to the differential 26 for the rear wheels so as to be connected and disconnected, an input side thereof is connected to the propeller shaft 20, and an output side thereof is connected to the differential 26 for the rear wheels. In this embodiment, the coupling device 10 is an electronically controlled coupling of which operation is controlled by the ECU 4. The ECU 4 controls a fastening force between a plurality of friction plates of the multiplate wet clutch to control the distributing amounts (distribution ratio) of the driving force (driving torque) to the front wheels 6 and to the rear wheels 8. In this embodiment, the torque distribution (front wheel: rear wheel) is controlled from the basic ratio (100:0), for example, to 50:50, according to a slipping state of the front and rear wheels.

Here, a fundamental control concept of the driving force distribution control by the coupling device 10 according to this embodiment is described. First, in this embodiment, the driving force is distributed to the front and rear wheels 6 and 8 according to the slipping state of the front and rear wheels 6 and 8 on the road surface at a driving force distributing amount for suppressing such a slipping state. In this embodiment, the slipping state is assumed to be a state where a slip (idle rotation) of the front and rear wheels 6 and 8 occurs over the road surface, such as traveling on the road surface with low µ (e.g., a snowy road or a wet road surface), traveling an uphill or a downhill, and escaping from a concave road surface. Moreover, as a modification, for example, the driving force distributing amounts to the front and rear wheels 6 and 8 may be controlled so that the total amount of three energy losses is decreased, the three energy losses include an energy loss in the front wheels 6 which is caused by the slip of the front wheels 6, an energy loss in the rear wheels 8 caused by the slip of the rear wheels 8, and a mechanical energy loss of a drive system while transmitting the driving force to the rear wheels 8 through the coupling device 10. As a further modification, the driving force distributing amounts to the front and rear wheels 6 and 8 may be controlled in consideration of an energy loss by a generation of heat at the plurality of friction plates of the coupling device 10 so that an excessive generation of heat from the coupling device 10 is prevented.

Figure 3:
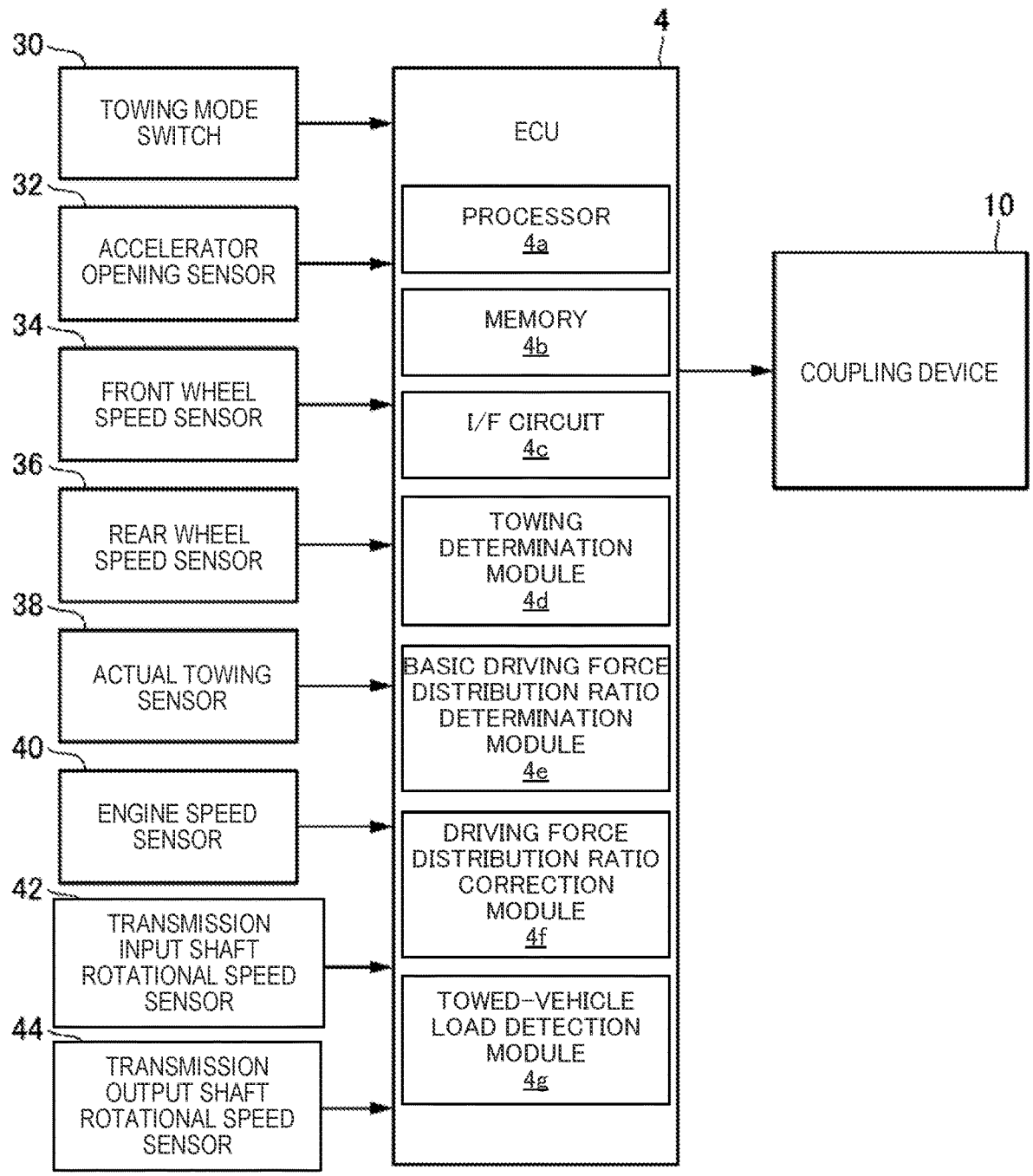
FIG. 3 is a block diagram illustrating a driving force distribution control system for the vehicle according to this embodiment of the present disclosure.

Next, a control block of the driving force distribution control system for the vehicle according to this embodiment of the present disclosure is described with reference to FIG. 3. FIG. 3 is a block diagram of the driving force distribution control system for the vehicle according to this embodiment of the present disclosure. As illustrated in FIG. 3, the ECU 4 has a processor (e.g. central processing unit (CPU)) 4a, memory 4b, and an I/F circuit 4c. In this embodiment, an output signal related to ON/OFF of a towing mode from a towing mode switch 30 which is provided near a driver's seat of the vehicle and is selectable manually by a driver, an output signal related to an accelerator pedal opening from an accelerator opening sensor 32, an output signal for detecting the slipping state of the front wheels 6 from a front wheel speed sensor 34 which detects a rotational speed of the front wheels 6, an output signal for detecting the slipping state of the rear wheels 8 from a rear wheel speed sensor 36 which detects a rotational speed of the rear wheels 8, an output signal for determining whether the towed vehicle is coupled from an actual towing sensor 38 which is a current sensor of the hitch H, an output signal related to an engine speed of the engine 12 from an engine speed sensor 40, an output signal related to a rotational speed of an input shaft of the transmission 14 from a transmission input shaft rotational speed sensor 42, and an output signal related to a rotational speed of an output shaft of the transmission 14 from a transmission output shaft rotational speed sensor 44, are inputted into the ECU 4.

The ECU 4 further comprises a towing determination module 4d, a basic driving force distribution ratio determination module 4e, a driving force distribution ratio correction module 4g, and a towed-vehicle load detection module 4g. These modules are executed by the processor 4a to perform their respective functions of the ECU 4 and are stored in the memory 4b as software. The towing determination module 4d is configured to determine whether the four-wheel drive vehicle 2 is towing the towed vehicle T, for example, based on a signal received from towing mode switch 30 or towing sensor 38. The basic driving force distribution ratio determination module 4e is configured to determine a basic force distribution ratio of the front and rear wheels 6 and 8 of the four-wheel drive vehicle 2 when the towing sensor 38 determines that the four-wheel drive vehicle 2 is not towing the towed vehicle T and/or the accelerator opening sensor 32 does not detect a demanded acceleration by the driver. The driving force distribution ratio correction module 4f is configured to correct the basic driving force distribution ratio so that the driving force distribution ratio to the rear wheels 8 is increased relative to the basic driving force distribution ratio of the front and rear wheels 6 and 8 determined by the basic driving force distribution ratio determination module 4d, when the towing sensor 38 determines that the four-wheel vehicle 2 is towing the towed vehicle T and the accelerator opening sensor 32 detects the driver's demanded acceleration. The towed-vehicle load detection module 4g is configured to detect a load of the towed vehicle T applied to the rear part of the four-wheel drive vehicle 2.

The output signal related to the opening of the accelerator pedal is a signal for outputting a numerical value equivalent to a stepping amount of the accelerator pedal by the driver, and the ECU 4 calculates a driver's demanded acceleration based on this output signal. Moreover, the ECU 4 calculates a value related to a reduction ratio of the transmission 14 based on the output signals from the transmission input shaft rotational speed sensor 42 and the transmission output shaft rotational speed sensor 44. The ECU 4 is connected to the coupling device 10, and controls the coupling device 10 based on the output signals, as will be described later. That is, the ECU 4 outputs a command value related to the driving force distribution of the front and rear wheels 6 and 8 (torque distribution ratio of the front and rear wheels 6 and 8) to the coupling device 10, and the coupling device 10 is controlled based on this command value so that the driving force is distributed to the front and rear wheels 6 and 8 according to the driving force distribution. Moreover, the ECU 4 calculates a coupling transmission torque of the coupling device 10 based on the command value related to this driving force distribution, etc. as will be described later.

Figure 4:
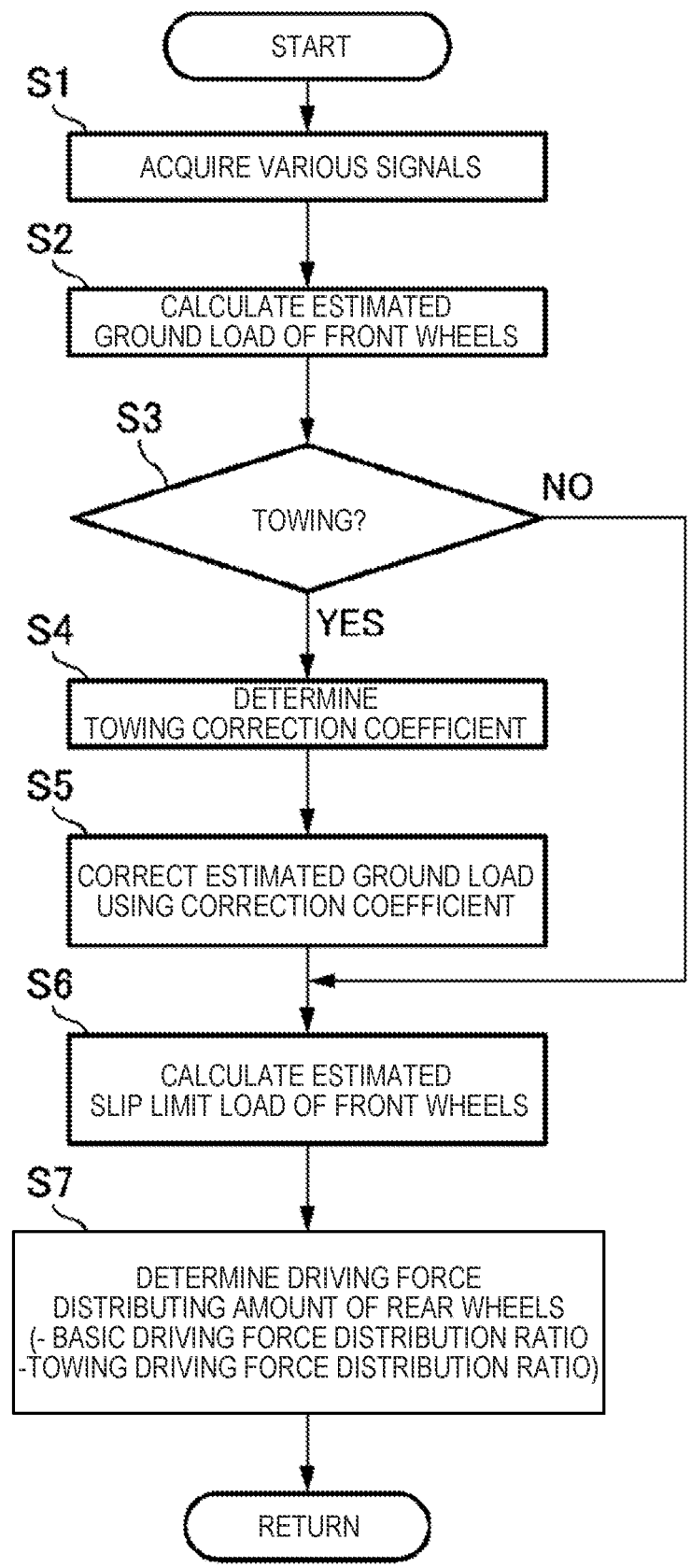
FIG. 4 is a flowchart illustrating a control processing executed by a driving force distribution control device of the driving force distribution control system for the vehicle according to this embodiment of the present disclosure.
Figure 5:
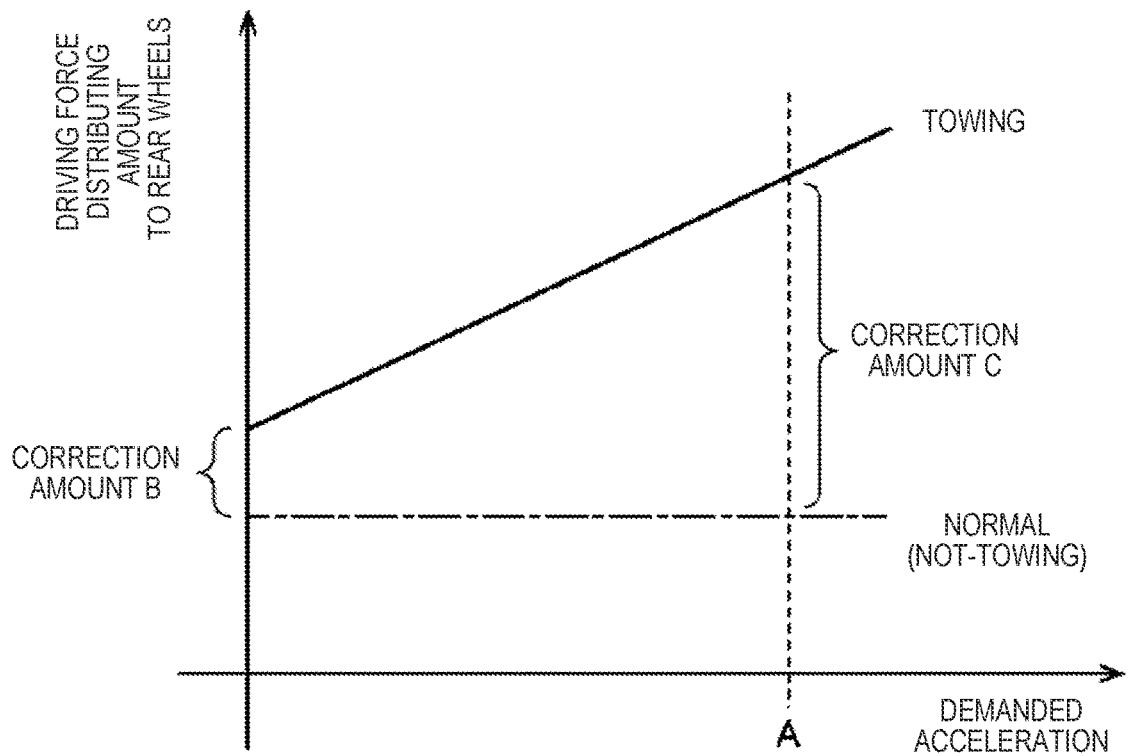
FIG. 5 is a graph illustrating a relationship between a driving force distributing amount to rear wheels controlled by the driving force distribution control device of the driving force distribution control system for the vehicle according to this embodiment of the present disclosure, and a demanded acceleration.
Figure 6:
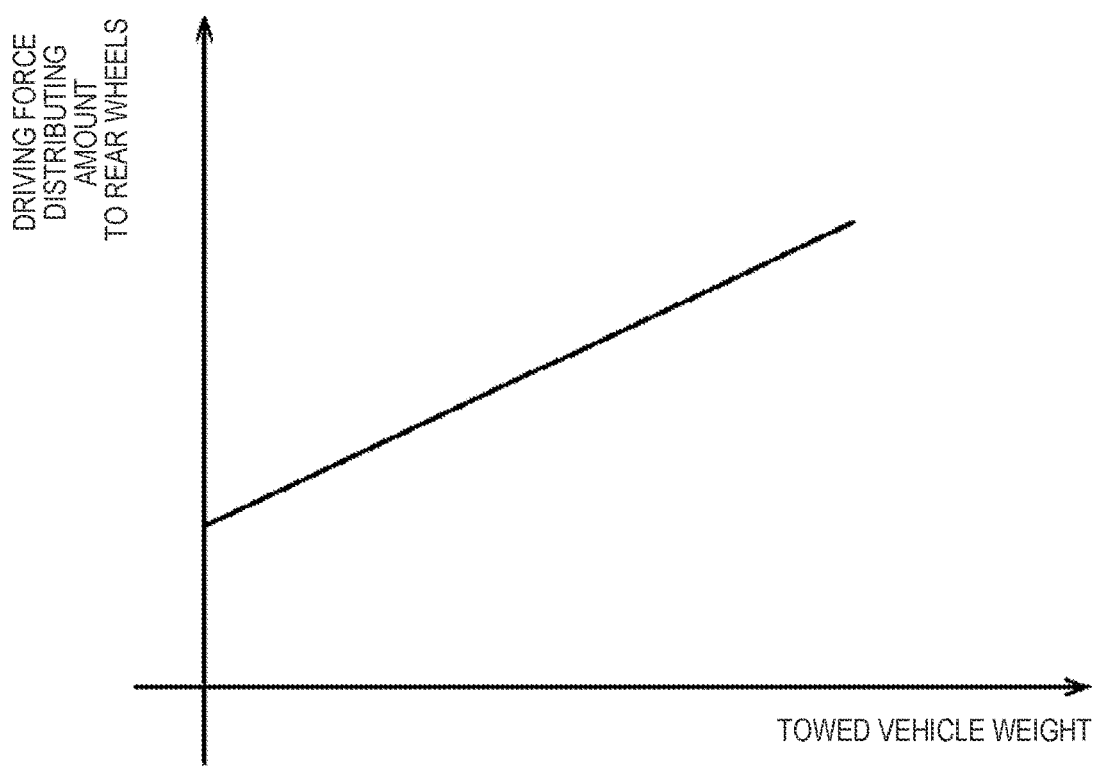
FIG. 6 is a graph illustrating a relation between the driving force distributing amount to the rear wheels controlled by the driving force distribution control device of the driving force distribution control system for the vehicle according to this embodiment of the present disclosure, and a weight of the towed vehicle.
Figure 7:
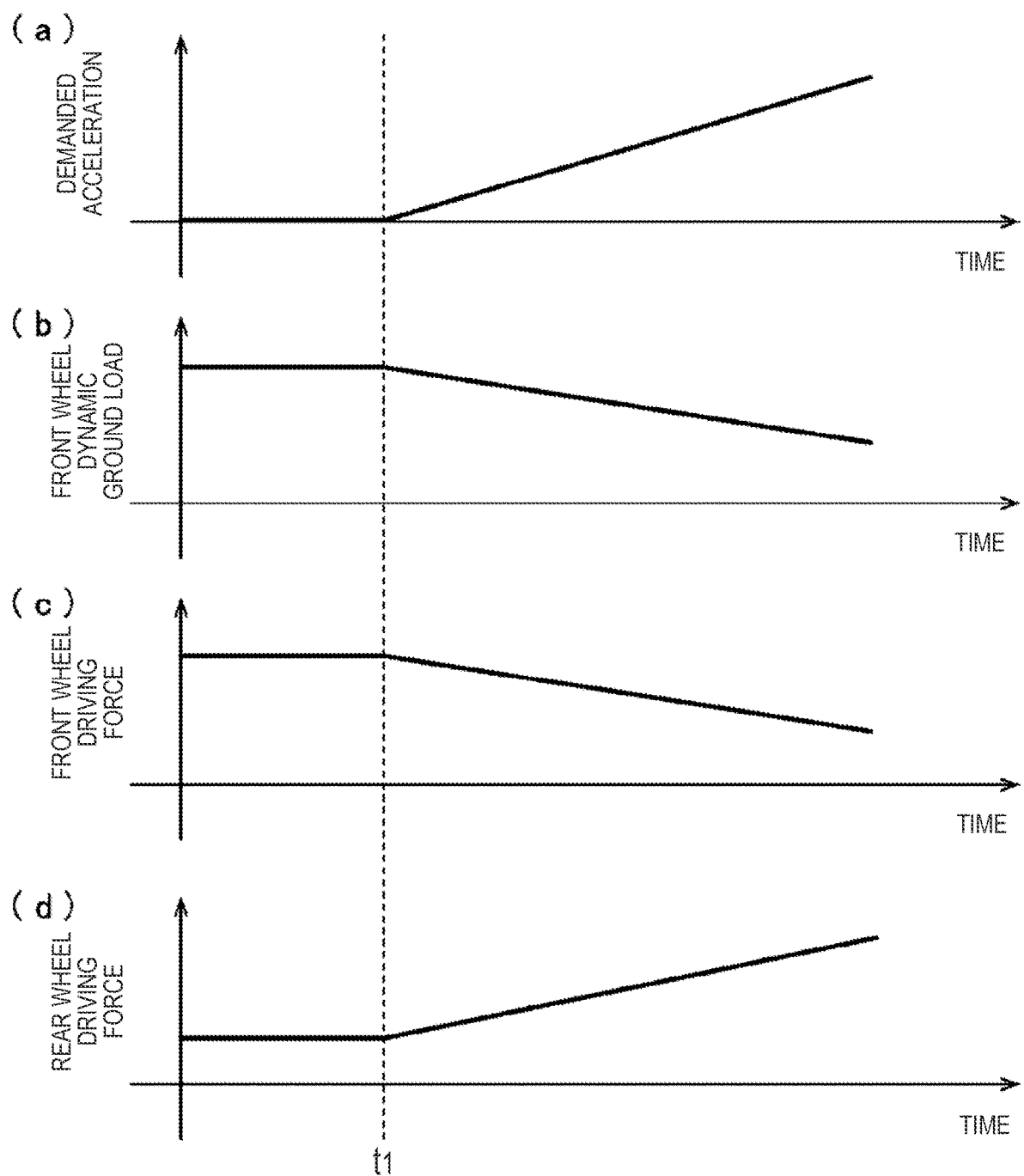
FIG. 7 is a time chart illustrating temporal changes in parameters relevant to a driving force distribution control in the driving force distribution control system for the vehicle according to this embodiment of the present disclosure.

Next, the control content of the driving force distribution control system for the vehicle according to this embodiment of the present disclosure is described with reference to FIGS. 4 to 7. FIG. 4 is a flowchart illustrating a control processing executed by the driving force distribution control device of the driving force distribution control system for the vehicle according to this embodiment of the present disclosure. FIG. 5 is a graph illustrating a relationship between the driving force distributing amount to the rear wheels controlled by the driving force distribution control device of the driving force distribution control system for the vehicle according to this embodiment of the present disclosure, and the demanded acceleration. FIG. 6 is a graph illustrating a relationship between the driving force distributing amount to the rear wheels controlled by the driving force distribution control device of the driving force distribution control system for the vehicle according to this embodiment of the present disclosure, and the weight of the towed vehicle. FIG. 7 is a time chart illustrating temporal changes in parameters relevant to the driving force distribution control in the driving force distribution control system for the vehicle according to this embodiment of the present disclosure. In FIG. 4, "S" indicates each step.

First, as illustrated in FIG. 4, at S 1, the ECU 4 (driving force distribution control device) acquires the output signals from the switches/sensors 30, 32, 34, 36, 38, 40, 42, and 44 described above. Moreover, the ECU 4 acquires the command value related to the driving force distribution of the front and rear wheels outputted to the coupling device 10 from ECU 4 at S1 as a signal. Moreover, at S1, the ECU 4 reads values of the weight of the vehicle, a front-wheel radius, and a rear-wheel radius, as the vehicle's specification (fixed values) which is stored in the memory inside the ECU 4. Moreover, the ECU 4 reads the engine specification which specifies a relation between the engine speed and the engine torque which is stored in the memory inside the ECU 4.

Next, the ECU 4 shifts to S2 where it calculates an estimated ground load of the rear wheels. In detail, at S2, the ECU 4 first calculates a value of the engine torque outputted from the engine 12 based on the engine speed and the engine specification which are acquired at S1. The ECU 4 also calculates a value of the transmission ratio of the transmission 14 based on the rotational speeds of the input shaft and the output shaft of the transmission 14 acquired at S1. The ECU 4 also calculates a torque outputted from the transmission 14 based on the calculated value of the engine torque and the calculated value of the transmission ratio. The ECU 4 also calculates a coupling transmission torque of the coupling device 10 based on the output torque from the transmission 14 and the command value related to the driving force distribution of the front and rear wheels acquired at S1. Then, at S2, the ECU 4 calculates the estimated ground load of the rear wheels based on the calculated value of the coupling transmission torque and the values of the vehicle's specification read at S1.

Next, the ECU 4 shifts to S3 where it determines whether the four-wheel drive vehicle 2 is towing the towed vehicle T (see FIG. 1). This determination is fundamentally performed based on whether the ECU 4 detects the output signal related to ON/OFF of the towing mode by the driver operating the towing mode switch 30 described above. In this embodiment, the ECU 4 also detects whether a current-flowing signal of a current sensor (the actual towing sensor 38 of FIG. 3) provided to the hitch H (hitch point) exists. If the current-flowing signal is ON, that is, if the towed vehicle T is actually coupled, the ECU 4 accepts the ON signal by the driver's operation of the towing mode switch 30 and determines that the four-wheel drive vehicle 2 is towing. In this embodiment, when the driver selects the towing mode, a correction processing at S4 and S5 is performed so as to suppress the discomfort of the driver, and while towing is actually performed, the ECU 4 determines that the four-wheel drive vehicle 2 is towing the towed vehicle so as to perform the processing at S4 and S5 during towing more effectively.

Next, at S3, if the ECU 4 determines that the four-wheel drive vehicle 2 is towing, it shifts to S4 where it first determines a towing correction coefficient as a processing during towing. The towing correction coefficient is a coefficient for correcting the estimated ground load calculated at S2 (the correction is performed at S5). At S4, the ECU 4 determines the correction coefficient as a first correction coefficient based on the weight of the vehicle (fixed value), a wheelbase of the vehicle (fixed value), a distance between the rear wheels and the hitch H (hitch point), the weight of the towed vehicle T (fixed value), and the driver's demanded acceleration of the vehicle.

Here, in this embodiment, the correction is made so that the driving force distributing amount to the rear wheels 8 becomes larger as the driver's demanded acceleration increases, relative to a normal, basic driving force distributing amount to the rear wheels (during not-towing) illustrated by a one-dot chain line illustrated in FIG. 5. As one example, when the demanded acceleration is "A," a towing correction amount C is obtained in order to increase the driving force distributing amount to the rear wheels. Moreover, in this embodiment, since the force $F_H$ (see FIG. 1) is applied during towing as described above even at a fixed traveling speed where the demanded acceleration is zero, the driving force distributing amount to the rear wheels is increased from when the demanded acceleration is zero as illustrated by a towing correction amount B in FIG. 5. Note that the driving force distributing amount to the rear wheels as illustrated in FIG. 5 is determined at S7.

Here, the basic driving force distributing amount described above is, for example, a driving force distributing amount suitably determined by the ECU 4 based on the road surface condition and the generation of heat from the coupling device 10 during normal not-towing travel (for example, below, it is set as [front wheel]:[rear wheel]=80:20).

Next, if the correction coefficient has already been determined as described above during the last processing of S4, and the driver's demanded acceleration during the current processing increases or decreases relative to the driver's demanded acceleration during the last processing, an incremental correction coefficient may be determined for obtaining an increase correction amount or a decrease correction amount corresponding to a difference from the demanded acceleration of the last correction amount (C), as a second correction coefficient. Moreover, if the correction coefficient has already been determined as described above during the last processing of S4, and the driver's demanded acceleration during the current processing has not been changed from the driver's demanded acceleration during the last processing, the correction coefficient may be set to 1, and a correction amount (C) similar to that of the last processing may be obtained, as a third correction coefficient.

Note that FIG. 5 illustrates a degree of decreasing the driving force distributing amount relative to the demanded acceleration during towing in linear in order to clarify the concept of the towing correction amount, but it may be nonlinear according to the specification of the four-wheel drive vehicle 2, characteristics of suspension systems, specification of the towed vehicle T, the magnitude of the demanded acceleration, etc.

Next, at S5, the ECU 4 multiplies the estimated ground load of the rear wheels calculated at S2 by the correction coefficient determined at S4. That is, at S5, the following calculation is performed.

[Corrected estimated ground load(S5)]=[Estimated ground load(S2)]×[Correction coefficient(S4)]

Next, at S6, the ECU 4 calculates an estimated slip limit load of the front wheels. In detail, the ECU 4 calculates the estimated slip limit load of the front wheels by multiplying the corrected estimated ground load calculated at S5 by a slip limit gain which is a given value determined in advance by an experiment etc. The slip limit gain is stored in the ECU 4 as a map according to the road surface μ.

Next, at S7, the ECU 4 first determines the driving force distributing amount to the front wheels which does not exceed the estimated slip limit load of the front wheels calculated at S6, and then determines the driving force distributing amount to the rear wheels based on the determined driving force distributing amount to the front wheels. Then, at S7, the ECU 4 controls the coupling device 10 so that the determined driving force distributing amount to the rear wheels is obtained. At S7, the ECU 4 determines the driving force distributing amount to the rear wheels based on a towing driving force distribution ratio (e.g., [front wheel]:[rear wheel]=90:10).

On the other hand, if the ECU 4 determines that the four-wheel drive vehicle 2 is not towing the towed vehicle at S3, it calculates at S6 the estimated slip limit load of the rear wheels by multiplying the estimated ground load of the rear wheels calculated at S2 by the slip limit gain described above, and it determines at S7 the driving force distributing amount to the rear wheels which does not exceed the estimated slip limit load of the rear wheels calculated at S6. The ECU 4 controls the coupling device 10 so that the determined driving force distributing amount to the rear wheels is obtained. At S7, the driving force distributing amount to the rear wheels is determined based on the normal, basic driving force distribution ratio (e.g., [front wheel]:[rear wheel]=80:20).

Moreover, in this embodiment, as illustrated in FIG. 6, the coupling device 10 is controlled so that the driving force distributing amount to the rear wheels becomes larger as the weight of the towed vehicle T (FIG. 1) increases. That is, in this embodiment, as described above, it is assumed in terms of the towing stability that the downward force $F_H$ (see FIG. 1) applied to the hitch H becomes larger as the weight of the towed vehicle T increases. In this embodiment, the total weight of the towed vehicle is obtained in advance from the specification of the towed vehicle T (see FIG. 1) and it is stored in the ECU 4 by a given operation, and the ECU 4 controls the coupling device 10 with reference to the chart illustrated in FIG. 6 as a map.

Moreover, as a modification, the ECU 4 estimates the downward force $F_H$ (see FIG. 1) applied to the hitch H based on a change in the estimated ground load of the rear wheels 8 before and after coupling the towed vehicle T, and the ECU 4 may control the coupling device 10 based on the estimation. Note that, in this case, the horizontal axis of the map illustrated in FIG. 6 is stored as the towed-vehicle load $F_H$, and the coupling device 10 is controlled with reference to the map by using the estimated force $F_H$ as the towed-vehicle load.

Next, as illustrated in chart (a) of FIG. 7, when the driver's demanded acceleration begins to increase from a certain time t1, the load $F_H$ (see FIG. 1) received from the towed vehicle T also increases according to the increased amount of the acceleration, and as illustrated in chart (b), a dynamic ground load of the front wheels 6 decreases resulting from the increase in the load $F_H$. On the other hand, in this embodiment, the correction is made so that the driving force distributing amount to the rear wheels become larger as the driver's demanded acceleration increases as described above (chart (d)) so that the driving force of the front wheels 6 is relatively reduced (chart (c)). Therefore, even if the dynamic ground load of the front wheels 6 decreases, the slip of the front wheels 6 will not occur.

Next, operation and effects according to this embodiment of the present disclosure is described. The driving force distribution control system 1 for the vehicle according to this embodiment of the present disclosure includes the driving force distributing device 10 which distributes the driving force of the front and rear wheels 6 and 8 of the four-wheel drive vehicle V (2), and the ECU 4 (driving force distribution control device) which controls the driving force distributing amounts of the front and rear wheels 6 and 8 by the driving force distributing device 10. The four-wheel drive vehicle 2 is the four-wheel drive vehicle in which the front wheels 6 are used as the main drive wheels, and the driving force of the front wheels 6 is distributed to the rear wheels 8 through the driving force distributing device 10. The towed vehicle T has the center of gravity position G so that, when it is coupled to the hitch H provided to the rear part of the four-wheel drive vehicle, it applies the downward load in the vehicle up-and-down direction to the rear part of the four-wheel drive vehicle through the hitch. When it is determined that the four-wheel drive vehicle V (2) is towing the towed vehicle T, the ECU 4 controls the driving force distributing device 10 so that the driving force distributing amount to the rear wheels 8 of the four-wheel drive vehicle becomes larger than when it determined to be not towing the towed vehicle T. Therefore, even if the rear part of the towing vehicle (four-wheel drive vehicle) V (2) is depressed by the towed vehicle T downwardly in the vehicle up-and-down direction, and in connection with this, the force in the direction in which the front wheels 6 of the four-wheel drive vehicle are raised occurs in the four-wheel drive vehicle V (2), the driving force distribution of the front wheels 6 can be reduced by the increased amount of the driving force distribution to the rear wheels 8, and therefore, the driving torque transmitted to the road surface from the front wheels 6 can be reduced. Moreover, as components of the force which acts on the four-wheel drive vehicle V (2) from the suspension system of the rear wheels 8 by increasing the driving force distribution to the rear wheels 8, when a component of the force which pushes up the rear part of the four-wheel drive vehicle V (2) in the vehicle up-and-down direction acts, in addition to a component of the force which propels the four-wheel drive vehicle V (2) forward, since the force for relatively sinking the front part of the four-wheel drive vehicle V (2) downwardly (a force in the pitching direction to make the four-wheel drive vehicle into a forward-inclining posture) occurs in the four-wheel drive vehicle 2, the lift of the front wheels 6 resulting from towing the towed vehicle T can be suppressed, and the ground load of the front wheels 6 can be increased. As the results, according to this embodiment, the four-wheel drive vehicle 2 which uses the front wheels 6 as the main drive wheels can suppress the slip of the front wheels 6 of which the ground load decreases during towing.

Moreover, according to this embodiment of the present disclosure, the ECU 4 (driving force distribution control device) determines the basic driving force distribution ratio of the front and rear wheels during not-towing and/or not-accelerating (for example, the distribution ratio which suppresses the slip depending on the road surface μ, the distribution ratio which reduces the heat release and the energy loss when the driving force distributing device 10 is the coupling device comprised of the plurality of friction plates). If the towing vehicle V is towing and accelerating, the basic driving force distribution ratio is corrected, and the driving force distributing amount to the rear wheels 8 is calculated based on the corrected driving force distribution ratio. The driving force distributing device 10 is controlled based on the calculated driving force distributing amount to more effectively suppress the slip of the front wheels 6.

Moreover, according to this embodiment of the present disclosure, the ECU 4 (driving force distribution control device) is provided with a demanded acceleration detector (e.g., the accelerator opening sensor 32) which detects the driver's demanded acceleration of the four-wheel drive vehicle V (2). When it is determined that the four-wheel drive vehicle is towing the towed vehicle, and the ECU 4 controls the driving force distributing device 10 so that the driving force distributing amount to the rear wheels 8 of the four-wheel drive vehicle becomes larger as the driver's demanded acceleration increases. Therefore, the driving force distribution of the front wheels can be reduced, and the slip of the front wheels 6 can be suppressed more effectively. The four-wheel drive vehicle 2 becomes in a rearward-inclining posture in the side view by an inertia force acting at the center of gravity and the ground load of the front wheels 6 becomes smaller as the acceleration of the four-wheel drive vehicle V (2) increases. However, according to this embodiment, since the driving force distribution of the front wheels 6 is reduced, the slip of the front wheels 6 can be suppressed.

Moreover, according to this embodiment of the present disclosure, since the ECU 4 (driving force distribution control device) controls the driving force distributing device 10 so that the driving force distributing amount to the rear wheels 8 of the four-wheel drive vehicle V (2) become larger as the weight of the towed vehicle T increases, the driving force distribution of the front wheels 6 can be reduced. Therefore, the slip of the front wheels 6 can be suppressed more effectively.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Further, if used herein, the phrase "and/or" means either or both of two stated possibilities.

DESCRIPTION OF REFERENCE CHARACTERS

V, 2 Four-wheel Drive Vehicle (Towing Vehicle)
T Trailer (Towed Vehicle)
G Center of Gravity of Towed Vehicle
H Hitch (Coupling Part)
F Force, Load
M Moment
1 Driving Force Distribution Control System for Vehicle
4 ECU (Driving Force Distribution Control Device)
6 Front Wheel
8 Rear Wheel
10 Coupling Device (Driving Force Distributing Device)

What is claimed is:

1. A driving force distribution control system for a four-wheel drive vehicle, configured to control a distributing amount of a driving force of front and rear wheels of the vehicle capable of towing a towed vehicle, comprising:
   a driving force distributing device configured to distribute the driving force of the front and rear wheels of the four-wheel drive vehicle; and
   a driving force distribution control device configured to control the driving force distributing amount of the front and rear wheels by the driving force distributing device,
   wherein the four-wheel drive vehicle uses the front wheels as main drive wheels and distributes the driving force of the front wheels to the rear wheels through the driving force distributing device,
   wherein, when the towed vehicle is coupled to a coupling part provided to a rear part of the four-wheel drive vehicle, the towed vehicle has the center of gravity position so that a downward load in a vehicle up-and-down direction is applied to the rear part of the four-wheel drive vehicle through the coupling part,
   wherein the driving force distribution control device includes a processor configured to execute a towing determination module to determine whether the four-wheel drive vehicle is towing the towed vehicle, and
   wherein, when the towing determination module determines that the four-wheel drive vehicle is towing the towed vehicle, the driving force distribution control device controls the driving force distributing device so that the driving force distributing amount to the rear wheels of the four-wheel drive vehicle becomes larger than the driving force distributing amount when the towing determination module determines that the four-wheel drive vehicle is not towing the towed vehicle.

2. The driving force distribution control system of claim 1, wherein the processor is further configured to execute:
   a basic driving force distribution ratio determination module to determine a basic driving force distribution ratio of the front and rear wheels of the four-wheel drive vehicle, when the towing determination module determines that the four-wheel drive vehicle is not towing the towed vehicle and/or an accelerator opening sensor does not detect a demanded acceleration by a driver; and
   a driving force distribution ratio correction module to correct the basic driving force distribution ratio so that the driving force distribution ratio to the rear wheels is increased relative to the basic driving force distribution ratio of the front and rear wheels determined by the basic driving force distribution ratio determination module, when the towing determination module determines that the four-wheel drive vehicle is towing the towed vehicle and the accelerator opening sensor detects the driver's demanded acceleration, and
   wherein, when the towing determination module determines that the four-wheel drive vehicle is towing the towed vehicle and the accelerator opening sensor detects the driver's demanded acceleration, the driving force distribution control device calculates the driving force distributing amount to the rear wheels based on the driving force distribution ratio corrected by the driving force distribution ratio correction module, and controls the driving force distributing device based on the driving force distributing amount to the rear wheels.

3. The driving force distribution control system of claim 2, wherein the driving force distribution control device further includes the accelerator opening sensor configured to detect the driver's demanded acceleration of the four-wheel drive vehicle, and
   wherein, when the towing determination module determines that the four-wheel drive vehicle is towing the towed vehicle, the driving force distribution control device controls the driving force distributing device so that the driving force distributing amount to the rear wheels of the four-wheel drive vehicle becomes larger as the driver's demanded acceleration detected by the accelerator opening sensor increases.

4. The driving force distribution control system of claim 2, wherein the driving force distribution control device controls the driving force distributing device so that the driving force distributing amount to the rear wheels of the four-wheel drive vehicle becomes larger as the weight of the towed vehicle increases.

5. The driving force distribution control system of claim 3, wherein the processor is further configured to execute a towed-vehicle load detection module to detect a load of the towed vehicle applied to the rear part of the four-wheel drive vehicle, and
   wherein the driving force distribution control device controls the driving force distributing device so that the driving force distributing amount to the rear wheels of the four-wheel drive vehicle becomes larger as the load detected by the towed-vehicle load detection module increases.

6. The driving force distribution control system of claim 5, wherein the towing determination module of the driving force distribution control device determines that the four-wheel drive vehicle is towing the towed vehicle, when a towing mode is selected by the driver via a towing mode switch.

7. The driving force distribution control system of claim 6, further comprising a towing sensor configured to determine whether the towed vehicle is coupled to the coupling part provided to the rear part of the four-wheel drive vehicle,
wherein, while the towing sensor determines that the towed vehicle is coupled, the towing determination module of the driving force distribution control device accepts a selection of the towing mode by the driver and determines that the four-wheel drive vehicle is towing the towed vehicle.

8. The driving force distribution control system of claim 1, wherein the driving force distribution control device further includes an accelerator opening sensor configured to detect the demanded acceleration by a driver of the four-wheel drive vehicle, and
wherein, when the towing determination module determines that the four-wheel drive vehicle is towing the towed vehicle, the driving force distribution control device controls the driving force distributing device so that the driving force distributing amount to the rear wheels of the four-wheel drive vehicle becomes larger as the driver's demanded acceleration detected by the accelerator opening sensor increases.

9. The driving force distribution control system of claim 1, wherein the driving force distribution control device controls the driving force distributing device so that the driving force distributing amount to the rear wheels of the four-wheel drive vehicle becomes larger as the weight of the towed vehicle increases.

10. The driving force distribution control system of claim 1, wherein the processor is further configured to execute a towed-vehicle load detection module configured to detect a load of the towed vehicle applied to the rear part of the four-wheel drive vehicle, and
wherein the driving force distribution control device controls the driving force distributing device so that the driving force distributing amount to the rear wheels of the four-wheel drive vehicle becomes larger as the load detected by the towed-vehicle load detection module increases.

11. The driving force distribution control system of claim 1, wherein the towing determination module of the driving force distribution control device determines that the four-wheel drive vehicle is towing the towed vehicle, when a towing mode is selected by a driver.

12. The driving force distribution control system of claim 1, further comprising a towing sensor configured to determine whether the towed vehicle is coupled to the coupling part provided to the rear part of the four-wheel drive vehicle,
wherein, while the towing sensor determines that the towed vehicle is coupled, the towing determination module of the driving force distribution control device accepts a selection of a towing mode by the driver and determines that the four-wheel drive vehicle is towing the towed vehicle.

13. The driving force distribution control system of claim 8, wherein the driving force distribution control device controls the driving force distributing device so that the driving force distributing amount to the rear wheels of the four-wheel drive vehicle becomes larger as the weight of the towed vehicle increases.

14. The driving force distribution control system of claim 8, wherein the processor is further configured to execute a towed-vehicle load detection module to detect a load of the towed vehicle applied to the rear part of the four-wheel drive vehicle, and
wherein the driving force distribution control device controls the driving force distributing device so that the driving force distributing amount to the rear wheels of the four-wheel drive vehicle becomes larger as the load detected by the towed-vehicle load detection module increases.

15. The driving force distribution control system of claim 8, wherein the towing determination module of the driving force distribution control device determines that the four-wheel drive vehicle is towing the towed vehicle, when a towing mode is selected by the driver.

16. The driving force distribution control system of claim 9, wherein the towing determination module of the driving force distribution control device determines that the four-wheel drive vehicle is towing the towed vehicle, when a towing mode is selected by the driver.

17. The driving force distribution control system of claim 10, wherein the towing determination module of the driving force distribution control device determines that the four-wheel drive vehicle is towing the towed vehicle, when a towing mode is selected by the driver.

18. The driving force distribution control system of claim 11, further comprising a towing sensor configured to determine whether the towed vehicle is coupled to the coupling part provided to the rear part of the four-wheel drive vehicle,
wherein, while the towing sensor determines that the towed vehicle is coupled, the towing determination module of the driving force distribution control device accepts a selection of the towing mode by the driver and determines that the four-wheel drive vehicle is towing the towed vehicle.

19. The driving force distribution control system of claim 3,
wherein the driving force distributing device includes a clutch coupling a propeller shaft and a differential gear mechanism for the rear wheels so as to be switchable between a connecting state and a disconnecting state, an input side thereof being connected to the propeller shaft and an output side thereof is connected to the differential gear mechanism for the rear wheels, and
wherein the driving force distributing device is controlled by the driving force distribution control device, and controls the distributing amount of the driving force (driving torque) of the front wheels and the rear wheels by controlling a fastening force between a plurality of friction plates of the clutch.

20. The driving force distribution control system of claim 1, wherein the towed vehicle is a trailer, and the trailer is coupled to the rear part of the four-wheel drive vehicle, that is the towing vehicle, through a hitch comprised of a hitch member provided to the rear part of the four-wheel drive vehicle and a coupler of the trailer.

* * * * *